United States Patent Office 2,742,515
Patented Apr. 17, 1956

2,742,515

DEHYDROGENATION CATALYST AND PROCESS

Archibald P. Stuart, Media, Pa., assignor to Sun Oil Company, Philadelphia, Pa., a corporation of New Jersey No Drawing. Application May 28, 1952, Serial No. 290,570

8 Claims. (Cl. 260—668)

This invention relates to new catalytic compositions. More particularly, the invention relates to new dehydrogenation catalysts and processes for their use.

Various metals and metallic oxides, either alone or deposited on a carrier, have heretofore been employed in dehydrogenation processes. Such catalysts and catalytic compositions, however, are usually subject to one or more difficulties which limit their use in commercial operations. For example, such catalysts are expensive to prepare, or are not sufficiently effective to cause dehydrogenation or naphthenes without the use of relatively drastic conditions, and the use of drastic conditions causes undesired reactions such as cracking. Also, heretofore described catalysts are often rapidly deactivated in the dehydrogenation reactions.

An object of the present invention is to provide a highly effective, inexpensive dehydrogenation catalyst. A further object is to provide a catalyst which may be employed for long periods of time without deactivation. Another object is to provide a catalyst effective in dehydrogenation reactions wherein only relatively mild conditions are required. A still further object is to provide a process for reforming hydrocarbons, and especially for dehydrogenating and isomerizing hydrocarbons.

It has now been found that by incorporating a small amount of a nitrogen-containing organic base on a dehydrogenation catalyst comprising a metallic oxide deposited on a carrier there is produced a catalytic composition remarkably effective in dehydrogenation processes, and which is also effective for other reforming reactions, such as isomerization. It has been further found that this catalytic composition is inexpensive, has a long life, and is effective for the dehydrogenation and isomerization of hydrocarbons under relatively mild conditions.

In my co-pending patent application Serial No. 208,232, filed January 27, 1951, there is described and claimed a catalytic composition comprising a metal sulfide deposited on a carrier and a chemisorbed quantity of an organic nitrogenous base. This catalytic composition is employed in hydrogenating reactions, and is to be distinguished from the catalytic composition of the present invention, which comprises a metallic oxide deposited on a carrier and a chemisorbed quantity of an organic nitrogenous base, and which is used in reforming processes such as the dehydrogenation of naphthenes.

In accordance with the present invention, a metallic oxide is deposited on a carrier and the resulting composition is treated with an organic nitrogenous base. The effective quantity of the base is that amount which is chemisorbed by the metallic oxide-carrier composition, and the so-formed composition containing chemisorbed organic nitrogenous base is the catalyst of the present invention.

By the expression "chemisorbed quantity," and terms of similar import, as used herein, is meant that quantity of organic nitrogenous base adsorbed on the metallic oxide-carrier composition which is held by bonds stronger than mere physical adsorption. Thus, physically adsorbed base may be relatively readily removed by desorption, whereas the chemisorbed base can be removed only by resort to relatively drastic conditions. For example, the portion of organic base held by physical adsorption is readily removed by maintaining the composition at a temperature above the boiling point and below the decomposition point of the base in a stream of an inert gas for time sufficient to achieve desorption, from about 1 to 6 hours usually being sufficient. The chemisorbed portion of the organic base is not affected by this operation.

Metallic oxide components which may be employed in the present catalytic composition are preferably the oxides of the metals of group 6 of the periodic table. Preferred metallic oxides to employ are the oxides of chromium, molybdenum and tungsten. Other metallic oxides, such as the oxides of copper, zinc, and vanadium, may be employed with good results as hereinafter described. These metallic oxides may be deposited on carriers heretofore employed, including, for example, bauxite, alumina, silica gel, mixtures of alumina and silica gel, including physical mixtures and coprecipitated compositions, and the like. Alumina is the preferred carrier to employ with the preferred metal oxides and may be employed with other metal oxides if desired. However, with basic or amphoteric metallic oxides, such as the oxides of zinc or copper, it is preferred to employ an acid type carrier, preferably a siliceous carrier, i. e., a carrier having silica as a component thereof. A preferred embodiment of the present invention comprises using as the carrier a spent cracking catalyst. In patent application Serial No. 200,700, filed December 13, 1950, now Patent No. 2,635,081, there is described and claimed a catalytic composition including as a component a spent cracking catalyst, and the spent cracking catalyst as there described is advantageously employed as the carrier in the present catalytic compositions. The spent cracking catalyst is preferably a catalyst consisting of silica and alumina which has been employed for the catalytic cracking of hydrocarbons until the cracking activity in the cracking operation has decreased at least about 30% below its initial value, so that regeneration for further use in cracking is not feasible. Silica-alumina cracking catalysts are well known, and generally contain a ratio of silica to alumina of 1:1 to 15:1 and preferably from 70% to 80% silica, from 30% to 10% alumina, and not more than 10% of other materials.

The quantity of metallic oxide deposited on a carrier may be varied from about 2% to 20% by weight of the carrier, but preferably is maintained wtihin the range of from 5% to 15% by weight.

The organic nitrogenous bases which may be employed are the organic nitrogen-containing compounds having a basic reaction, or a nitrogen-containing compound which is converted thereto under the conditions of the hydrogenation processes such as butyl cyanide and cyclohexanone oxime. It is preferred to employ an organic base wherein a nitrogen atom is connected in a ring which may be of aromatic or naphthenic character. Examples of preferred organic bases are quinoline, pyridine, quinaldine, piperidine, pyrrole, and their alkyl derivatives. Other organic nitrogenous bases which may be employed with good results include, for example, aniline, toluidine, decylamine, and other amines. The nitrogen base should not be decomposed under dehydrogenating conditions, and hence bases wherein the nitrogen atom is connected to a tertiary carbon atom are not preferred. Preferred nitrogenous bases are those wherein the nitrogen atom is connected to a primary or secondary carbon atom or atoms, and which have from 4 to 16 carbon atoms per molecule.

The present catalyst is prepared by first depositing a metal oxide on a carrier, which may be performed by methods heretofore known. For example, alumina may be dipped into an ammoniacal solution of ammonium paramolybdate, with subsequent drying and calcining at 300° C. for three hours. The resulting composition consisting of molybdic oxide, $MoO_3$, deposited on alumina is then treated with an organic nitrogenous base, preferably with the base in the vapor phase. This may be conveniently accomplished by passing a stream of an inert gas admixed with vapors of the base over the catalyst at an elevated temperature, preferably from 100° C. to 400° C. The physically adsorbed base may then be removed by continuing the contact, at an elevated temperature, with the stream of inert gas without the added vapors of the base. This causes desorption of the physically adsorbed base leaving the chemisorbed base attached to the catalytic composition. Other methods may be employed, such as dipping the catalyst in the liquid or liquefied base, or in a solution thereof, and thereafter heating preferably in a vacuum or in a stream of inert gas to desorb the physically adsorbed base. Only a relatively small amount of organic base is chemisorbed and such small amount results in a large increase in dehydrogenation efficacy. The amount of chemisorbed base will vary somewhat with the metal oxide and carrier employed, but will usually be between 0.01 and 0.2 milliequivalent per gram of metallic oxide-carrier. All of the physically adsorbed base need not be removed since a small amount thereof does not cause deleterious effects in the dehydrogenation process. Excessive amounts of physically adsorbed base tend to be removed or desorbed from the composition during dehydrogenation and hence may contaminate the product.

In accordance with the present invention, it is essential that the catalyst be treated with the nitrogenous base prior to its use in dehydrogenation processes, i. e., the addition of a nitrogenous base to an oil and subsequent dehydrogenation thereof does not give comparable results, and may exhibit deleterious effects.

The catalysts of the present invention are especially suitable for the dehydrogenation of naphthenic components of petroleum fractions. For example, dehydrogenation of a gasoline fraction containing naphthenic hydrocarbons converts a substantial proportion of the naphthenes to aromatic hydrocarbons, and hence increases the octane number of the gasoline fraction. The catalyst is especially effective in this instance since, as has been found, alkylcyclopentanes are isomerized to cyclohexanes in the process, the cyclohexanes then being dehydrogenated to benzene or alkyl substituted benzenes. The catalytic composition of the present invention is accordingly useful in reforming gasoline hydrocarbon fractions, i. e., in converting gasoline fractions of low octane number to gasoline fractions of high octane number. Other reactions important in increasing the octane number and lead susceptibility of gasoline are also observed, such as isomerization of normal paraffins to iso-paraffins and desulfurization.

The catalysts of the present invention are effective for the dehydrogenation of naphthenes, and for reforming and isomerization, under relatively mild conditions, the optimum conditions for a given application being dependent upon the particular charge stock, metallic oxide, carrier, and nitrogenous base employed. In general, using the present catalysts the temperature is advantageously maintained from 300° C. to 600° C., and preferably from 400° C. to 525° C., and the pressure is maintained from 150 p. s. i. g. to 700 p. s. i. g., and preferably from 250 p. s. i. g. to 550 p. s. i. g., such conditions being designated as "dehydrogenating conditions" or "reforming conditions." The following example illustrates embodiments of the present invention.

*Example*

A catalytic composition consisting of 10% molybdic oxide on alumina was prepared by impregnating alumina particles with an ammoniacal solution of ammonium paramolybdate. Water and ammonia were expelled by gentle heating, and the resulting mass calcined by heating to 300° C. for three hours. The resulting catalytic composition, consisting of 10% molybdic oxide on alumina, was divided into two portions. One portion was further treated, in accordance with the present invention as described below, and results obtained therewith in dehydrogenation processes compared with the results obtained in comparable processes using as the catalyst the other portion without further treatment.

A portion of the composition prepared as described above was treated with quinoline in the vapor state, at 300° C., in a stream of nitrogen. This was accomplished by dropwise addition of quinoline to the heated composition maintained in a stream of nitrogen. Excess quinoline, i. e., quinoline not chemisorbed, was removed by passing a stream of nitrogen over the catalyst, at 300° C. for four hours.

Both of the above described catalytic compositions were employed in comparable dehydrogenation processes using the same charge stock. The charge stock consisted of a straight run gasoline fraction having an initial boiling point of 73° C., a 50% point of 92° C., and an end point of 135° C. (Engler distillation). The gasoline fraction contained, in percent by volume, aromatics=6%, olefins=1%, naphthenes=43% and paraffins=50%. The naphthenes consisted of 72.1% cyclohexanes and 27.9% cyclopentanes.

Operating conditions of temperature and pressure were varied, and a space rate (liquid hourly space velocity) of 3 was employed. Operation conditions and results obtained are shown in the following table:

| | Temp., °C. | Press., p. s. i. g. | Composition of Product (vol. percent) | | | | Density, $d_4^{20}$ | Conversion of Naphthenes, to Aromatics Wt. Percent |
|---|---|---|---|---|---|---|---|---|
| | | | Aromatics | Olefins | Naphthenes | Paraffins | | |
| Catalyst with Quinoline | 467.8 | 300 | 29 | 6 | 17 | 48 | 0.751 | 62 |
| | 482.2 | 500 | 37 | 9 | 11 | 43 | 0.763 | 65 |
| | 496.1 | 300 | 44 | 9 | 9 | 38 | 0.776 | 64 |
| Catalyst without Quinoline | 482.2 | 300 | 25 | 5 | 18 | 52 | 0.745 | 47 |
| | 482.2 | 500 | 24 | 5 | 15 | 56 | 0.744 | 38 |
| | 496.1 | 500 | 27 | 7 | 15 | 51 | 0.747 | 52 |

Hydrogen was removed from the process at a rate of about 5 moles per mole of hydrocarbon charged.

Analysis of the product obtained when using catalyst with quinoline at 496.1° C. and 300 p. s. i. g. showed conversion of over 22 percent by volume of cyclopentanes, principally to aromatics, so that isomerization of the cyclopentanes to cyclohexanes of at least this amount occurred.

The data of the table show that while molybdic oxide deposited on alumina serves as a dehydrogenation catalyst, treatment thereof with quinoline in accordance with the present invention produces a markedly superior catalyst.

The foregoing example illustrates embodiments of the present invention. Other embodiments will be apparent to those skilled in the art. For example, the present catalytic composition is advantageously employed for the dehydrogenation of substantially pure naphthenes, such as cyclohexane, methylcyclohexane, or dimethylcyclohexane to prepare, respectively, benzene, toluene, or xylene. Mixtures of naphthenes may also be employed, such as mixture of cyclopentanes and cyclohexanes, the cyclopentanes being isomerized to cyclohexanes in the process, and subsequently dehydrogenated to the corresponding aromatic. Also, when other metallic oxides, carriers or organic nitrogenous bases are employed, as hereinbefore described, substantially similar results are obtained as described in the above example.

The invention claimed is:

1. Process for the dehydrogenation of hydrocarbons boiling in the gasoline range which comprises contacting said hydrocarbons under dehydrogenating conditions with a catalytic composition comprising a carrier selected from the group consisting of bauxite, alumina, silica gel, mixtures of alumina and silica gel, and a spent cracking catalyst having deposited thereon from 2% to 20% of a metallic oxide dehydrogenating catalyst selected from the group consisting of chromium oxide, molybdenum oxide, tungsten oxide, copper oxide, zinc oxide and vanadium oxide and having chemisorbed thereon, in an amount effective to increase dehydrogenating activity, an organic nitrogenous base having from 4 to 16 carbon atoms per molecule.

2. Process according to claim 1 wherein said metallic oxide is molybdic oxide.

3. Process according to claim 1 wherein said organic nitrogenous base is quinoline.

4. Process for the dehydrogenation of naphthenes which comprises contacting said naphthenes under dehydrogenating conditions with a catalytic composition consisting essentially of alumina having deposited thereon from 2% to 20% molybdic oxide and having chemisorbed thereon from 0.01 to 0.2 milliequivalents of quinoline per gram of molybdenum oxide-alumina catalyst.

5. Process for the preparation of an improved dehydrogenating catalytic composition which comprises depositing from 2% to 20% of a metallic oxide selected from the group consisting of chromium oxide, molybdenum oxide, tungsten oxide, copper oxide, zinc oxide and vanadium oxide on a carrier selected from the group consisting of bauxite, alumina, silica gel, mixtures of alumina and silica gel, and a spent cracking catalyst and treating the resulting composition with an organic nitrogenous base having from 4 to 16 carbon atoms per molecule whereby the final composition has a chemisorbed quantity of said base.

6. Process for the preparation of an improved dehydrogenating catalytic composition which comprises depositing molybdenum oxide on alumina and treating the resulting composition with quinoline in the vapor phase to obtain a chemisorbed quantity of from 0.01 to 0.2 milliequivalents of said base per gram of molybdenum oxide-alumina composition.

7. An improved dehydrogenating catalytic composition comprising a carrier selected from the group consisting of bauxite, alumina, silica gel, mixtures of alumina and silica gel, and spent cracking catalyst, having deposited thereon from 2% to 20% of a metallic oxide selected from the group consisting of chromium oxide, molybdenum oxide, tungsten oxide, copper oxide, zinc oxide and vanadium oxide, and having a chemisorbed quantity, effective to increase dehydrogenating activity, of an organic nitrogenous base having from 4 to 16 carbon atoms per molecule.

8. An improved dehydrogenating catalytic composition according to claim 7 wherein said organic nitrogenous base is from 0.01 to 0.2 milliquivalent per gram of the carrier-metal oxide composition.

References Cited in the file of this patent

UNITED STATES PATENTS

| | | |
|---|---|---|
| 2,029,895 | Rittmeister | Feb. 4, 1936 |
| 2,162,276 | Weiss | June 13, 1939 |
| 2,184,235 | Groll et al. | Dec. 19, 1939 |
| 2,322,622 | Fischer et al. | June 22, 1943 |
| 2,369,524 | Berg et al. | Feb. 13, 1945 |
| 2,375,573 | Meier | May 8, 1945 |
| 2,409,695 | Laughlin | Oct. 22, 1946 |
| 2,430,632 | Fetterly | Nov. 11, 1947 |
| 2,454,724 | Tamele et al. | Nov. 23, 1948 |

OTHER REFERENCES

Mills et al. (publication): "Journal of the American Chemical Society," vol. 72, issue 4, pages 1554–1560, April 1950.